United States Patent
Shimokawa et al.

(10) Patent No.: US 9,581,851 B2
(45) Date of Patent: Feb. 28, 2017

(54) LIQUID CRYSTAL DISPLAY DEVICE

(71) Applicant: Japan Display Inc., Tokyo (JP)

(72) Inventors: Hiroyuki Shimokawa, Tokyo (JP); Michihide Shibata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/734,770

(22) Filed: Jun. 9, 2015

(65) Prior Publication Data

US 2015/0362775 A1   Dec. 17, 2015

(30) Foreign Application Priority Data

Jun. 11, 2014   (JP) .................................. 2014-120613

(51) Int. Cl.
  *G02F 1/1333*   (2006.01)
  *G02F 1/1335*   (2006.01)
  *G02F 1/1339*   (2006.01)

(52) U.S. Cl.
  CPC ...... *G02F 1/133512* (2013.01); *G02F 1/1336* (2013.01); *G02F 1/1339* (2013.01); *G02F 1/133308* (2013.01); *G02F 2001/133314* (2013.01); *G02F 2201/50* (2013.01)

(58) Field of Classification Search
  CPC .......................................... G02F 2001/133314
  See application file for complete search history.

(56) References Cited

U.S. PATENT DOCUMENTS

| 2009/0054115 | A1* | 2/2009 | Horrdin | G06F 1/1616 455/575.8 |
|---|---|---|---|---|
| 2009/0079706 | A1 | 3/2009 | Mishima | |
| 2010/0060601 | A1* | 3/2010 | Oohira | G02F 1/133308 345/173 |
| 2014/0268868 | A1* | 9/2014 | Hatta | G02F 1/133606 362/606 |

FOREIGN PATENT DOCUMENTS

JP     2009-080289 A     4/2009

* cited by examiner

*Primary Examiner* — Phu Vu
(74) *Attorney, Agent, or Firm* — Typha IP LLC (57) ABSTRACT

In order to avoid a phenomenon that a liquid crystal display panel peeling off from a mold caused by expansion of the air inside the mold when attaching a touch panel to the liquid crystal display panel in a decompressed atmosphere, there is provided a liquid crystal display device in which a liquid crystal display panel is attached to a mold accommodating a backlight by a light shielding tape and a touch panel is attached to the liquid crystal display panel, wherein the light shielding tape includes adhesives on the both sides of a black base, and the light shielding tape has a portion without the adhesive on one side of the tape for a predetermined length of the light shielding tape in a circumferential direction.

15 Claims, 11 Drawing Sheets

LIQUID CRYSTAL DISPLAY DEVICE

CLAIM OF PRIORITY

The present application claims priority from Japanese Patent Application JP 2014-120613 filed on Jun. 11, 2014, the content of which is hereby incorporated by reference into this application.

BACKGROUND OF THE INVENTION (1) Field of the Invention

The invention relates to a display device, and more particularly to a liquid crystal display including a touch panel.

(2) Description of the Related Art

In a liquid crystal display device, a TFT substrate where pixel electrodes and thin film transistors (TFT) are formed in a matrix shape and an opposite substrate facing the TFT substrate are arranged and liquid crystals are interposed between the TFT substrate and the opposite substrate. Then, an image is formed by controlling a light transmittance of liquid crystal molecules per each pixel.

In a small and medium sized liquid crystal display device, an input method with a touch panel is widely used. A touch panel is attached to the upper surface of an upper polarizing plate in a liquid crystal display panel with a bonding agent. In this attachment process, the attachment work is often performed in a decompressed atmosphere in order to avoid air bubbles entering into the bonding agent.

When the liquid crystal display device is moved from the air to a decompressed atmosphere, balance of pressure may collapse and a hermetically sealed air may expand in an enclosed space, which causes a deformation in the liquid crystal display device. Japanese Patent Laid-Open Publication No. 2009-80289 discloses the structure in which when a touch panel is attached to a liquid crystal display panel in the decompressed atmosphere, an air hole is formed in the touch panel in order to inhibit deformation from occurring in the touch panel because of the expansion of the air inside the touch panel.

SUMMARY OF THE INVENTION

A small and medium sized liquid crystal display device is strongly requested to increase a display region as large as possible with the outer size kept at constant. As the result, a fringe portion around the display region gets narrower in the liquid crystal display panel.

A small and medium sized liquid crystal display device is constituted to mount a liquid crystal display panel on a mold and accommodate a backlight into the mold. The mold and the liquid crystal display panel are attached together by a light shielding tape having an adhesive on its surface. When the fringe portion of the liquid crystal display panel gets narrower, the area to attach the mold and the liquid crystal display panel gets smaller, and as the result, the adhesive strength of the liquid crystal display panel and the mold cannot be obtained as much as ever.

On the other hand, a small and medium sized liquid crystal display device is widely used for mobile devices such as a cellular phone, a Digital Still Camera (DSC), and a tablet type PC. In this mobile device, in order to avoid a foreign substance from externally entering into a space between a backlight and a liquid crystal display panel and a defect resulting from the foreign substance, the space between the backlight and the liquid crystal display panel or the inside of the mold is hermetically sealed.

A touch panel is attached to the liquid crystal display panel after mounting the liquid crystal display panel and the backlight into the mold. At this point, in order to avoid air bubbles from entering into a bonding agent, this attachment process is performed in the decompressed atmosphere.

The mold, however, is hermetically sealed by the liquid crystal display panel and under the decompressed atmosphere, the air inside the mold expands and there occurs a stress of peeling off the liquid crystal display panel from the mold. When the fringe portion is narrow, the adhesive force of the mold and the liquid crystal display panel gets smaller, and in the decompressed atmosphere, the liquid crystal display panel may peel off from the mold disadvantageously. This problem similarly occurs also in the case of attaching the touch panel to the liquid crystal display panel with an adhesive in the decompressed atmosphere.

An object of the invention is to avoid such a phenomenon that when a touch panel is attached to a liquid crystal display panel in the decompressed atmosphere, the air inside the mold expands to peel off the liquid crystal display panel.

The invention is to solve the above object and the concrete means are as follows.

(1) A liquid crystal display device in which a liquid crystal display panel is attached to a mold accommodating a backlight by a light shielding tape and a touch panel is attached to the liquid crystal display panel, wherein the light shielding tape includes adhesives on the both sides of a black base, and the light shielding tape has a portion without the adhesive on one side of the tape for a predetermined length of the light shielding tape in a circumferential direction.

(2) The liquid crystal display device according to the above (1), wherein the touch panel is attached to the liquid crystal display panel by an ultraviolet curing resin.

(3) The display according to the above (1), wherein the predetermined length of the light shielding tape in a circumferential direction where the adhesive does not exist is 2 mm and less.

(4) The display according to the above (1), wherein the light shielding tape has a portion without the adhesive on the other side of the tape for a predetermined length of the light shielding tape in a circumferential direction.

According to the invention, even when an assembled body of a liquid crystal display panel and a mold is put in the decompressed atmosphere, the air inside the mold can run away outward, hence to avoid the problem that the liquid crystal display panel peels off from the mold caused by the expansion of the air inside the mold.

According to this, a touch panel-equipped liquid crystal display device of high reliability can be realized. Instead of a touch panel, when a front window is attached to a liquid crystal display panel, or also in a liquid crystal display device including both the touch panel and the front window, the same effect can be obtained.

DETAILED DESCRIPTION OF THE PREFERRED EMBODIMENTS

Hereinafter, the contents of the invention will be described in details referring to the preferred embodiments.

First Embodiment

Figure 1:
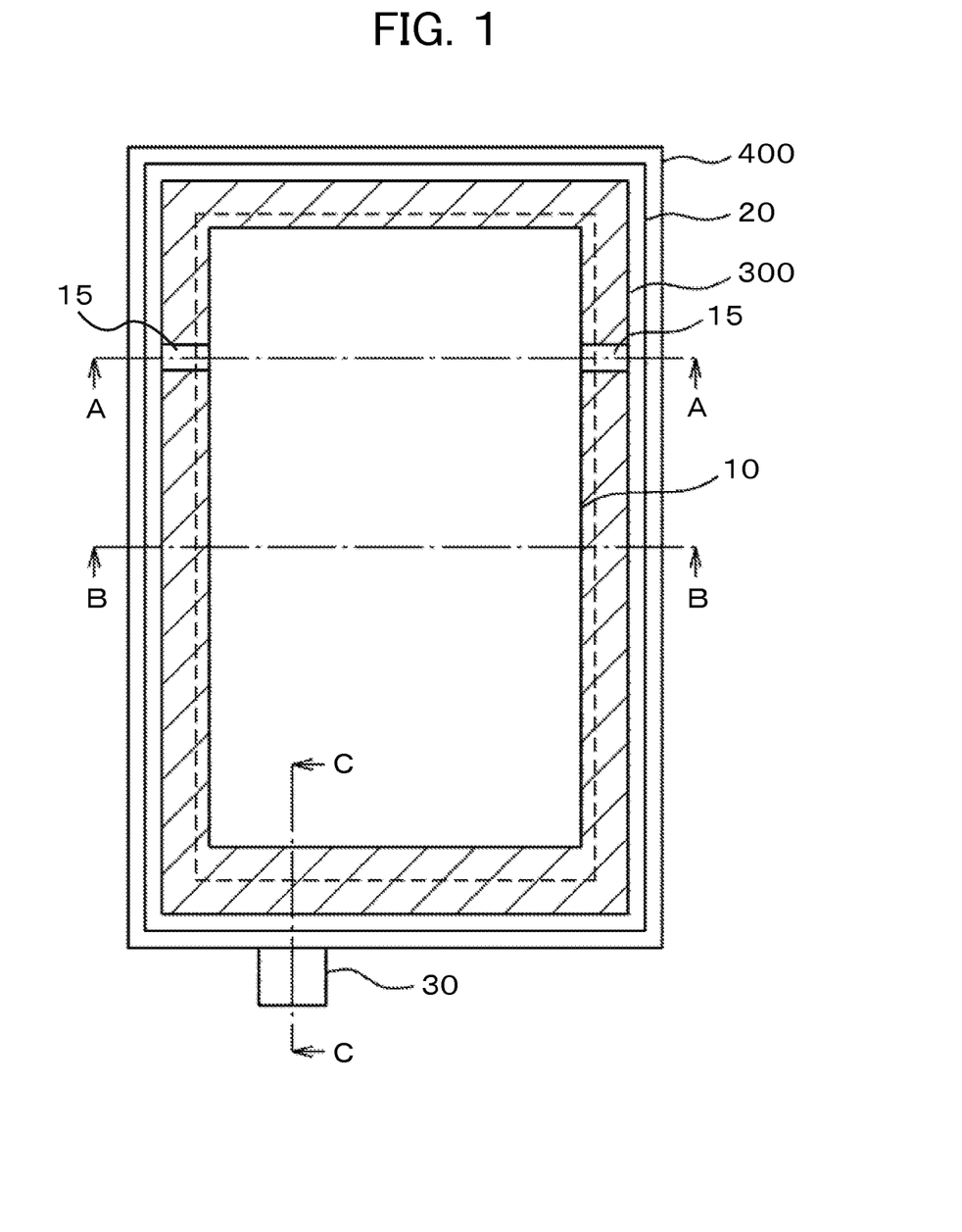
FIG. 1 is a top plan view of a liquid crystal display device to which the invention is applied.

FIG. 1 is a perspective plan view of a liquid crystal display device to which the invention is applied. In FIG. 1, a liquid crystal display panel 300 mounted on a mold 20 exists under a touch panel 400. In FIG. 1, the outer shape of the touch panel 400 is slightly larger than the outer shape of the mold 20 and the outer shape of the mold 20 is slightly larger than the outer shape of the liquid crystal display panel 300. The liquid crystal display panel 300 and the mold 20 are attached together by a light shielding tape 10. In FIG. 1, a hatching portion is the light shielding tape 10.

The outer shape of the liquid crystal display panel is the same as that of the light shielding tape 10. The inner end of the light shielding tape 10 exists at a side slightly inward from the inner end of the mold 20. The display region of the liquid crystal display panel 300 exists in the inward side from the inner end of the light shielding tape 10. In FIG. 1, the structure of a backlight is omitted. In FIG. 1, a flexible wiring substrate 30 to supply power or signals to an LED that is a light source of the backlight extends outwardly from a short side of the liquid crystal display device.

In FIG. 1, a vent hole 15 without adhesive is provided in a part of the light shielding tape 10. Although the structure of the vent hole 15 will be described later, when the touch panel 400 is attached to the liquid crystal display panel 300 with a bonding agent, the vent hole 15 helps the air inside the mold 20 to be exhausted outward; therefore, it is possible to avoid generation of a stress for peeling off the liquid crystal display panel 300 from the mold 20 caused by expansion of the air inside the mold 20.

Figure 2:
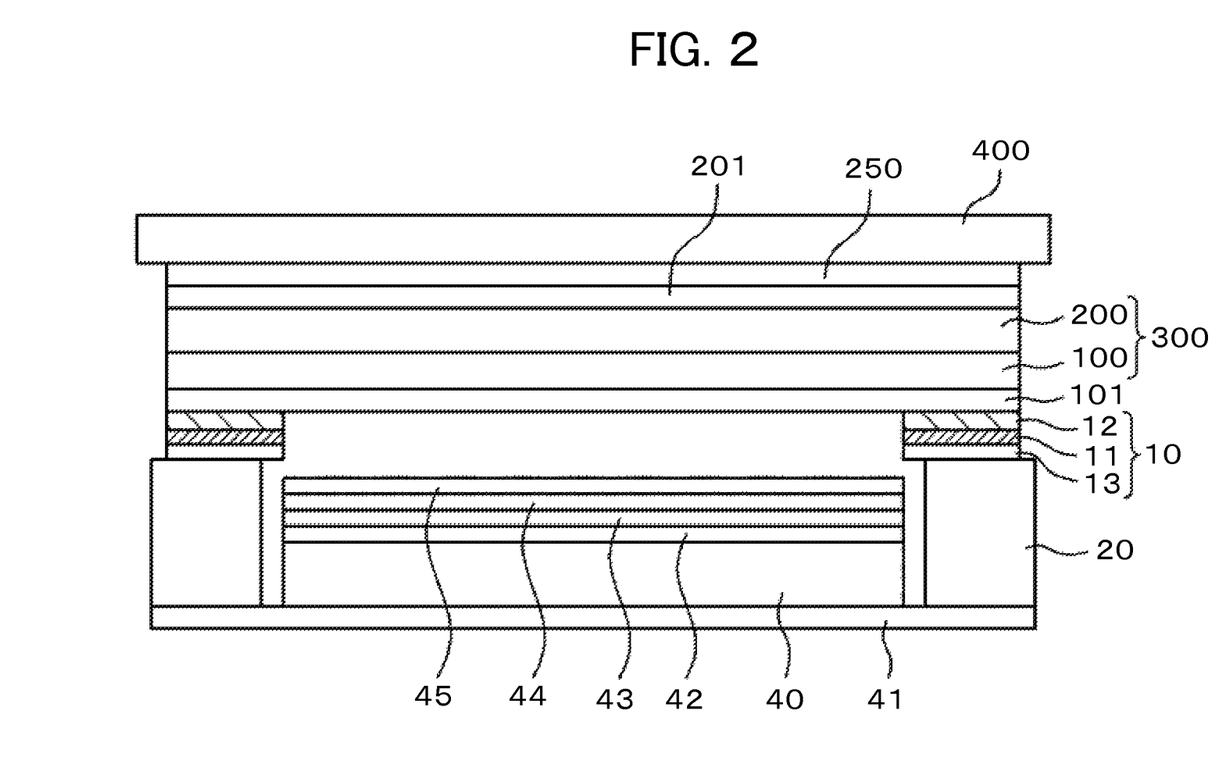
FIG. 2 is a cross-sectional view taken along the line A-A of FIG. 1.
Figure 3:
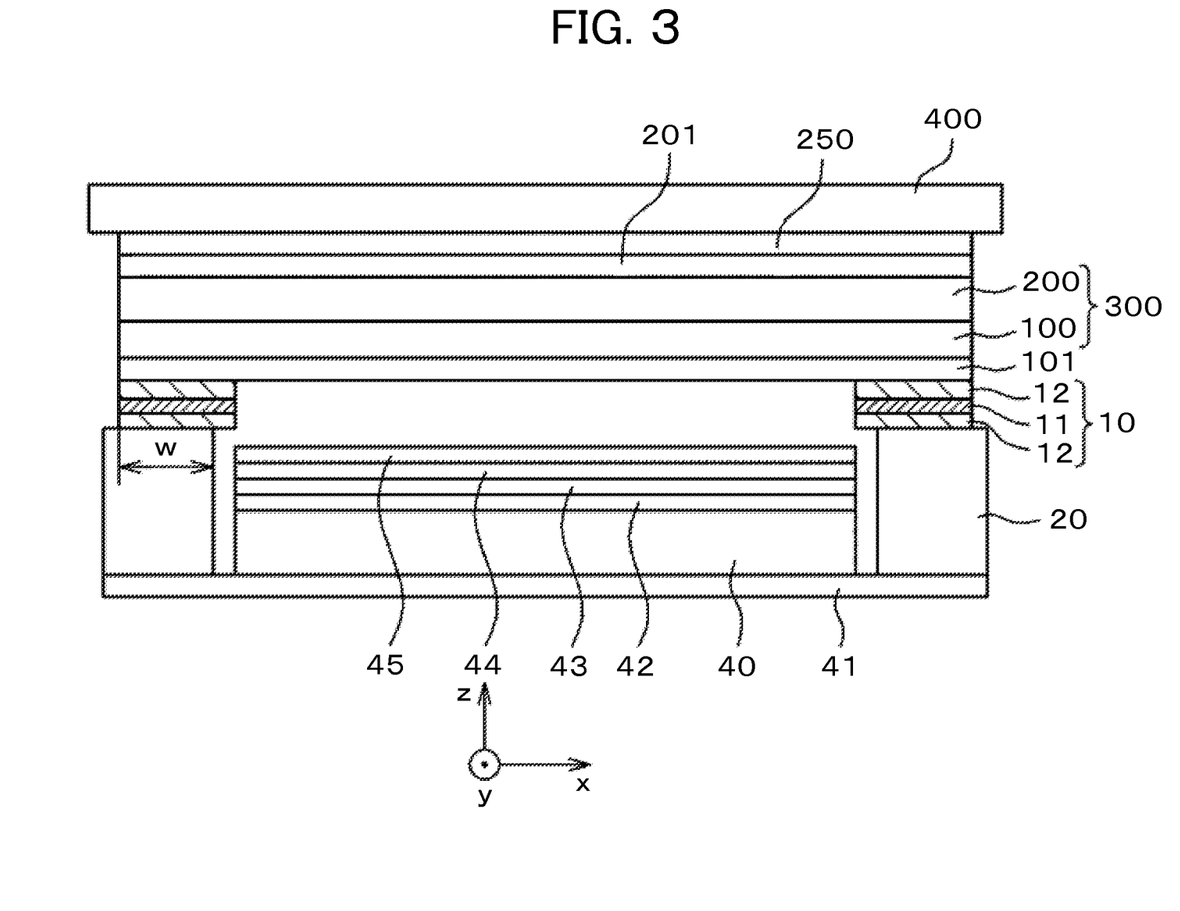
FIG. 3 is a cross-sectional view taken along the line B-B of FIG. 1.
Figure 7:
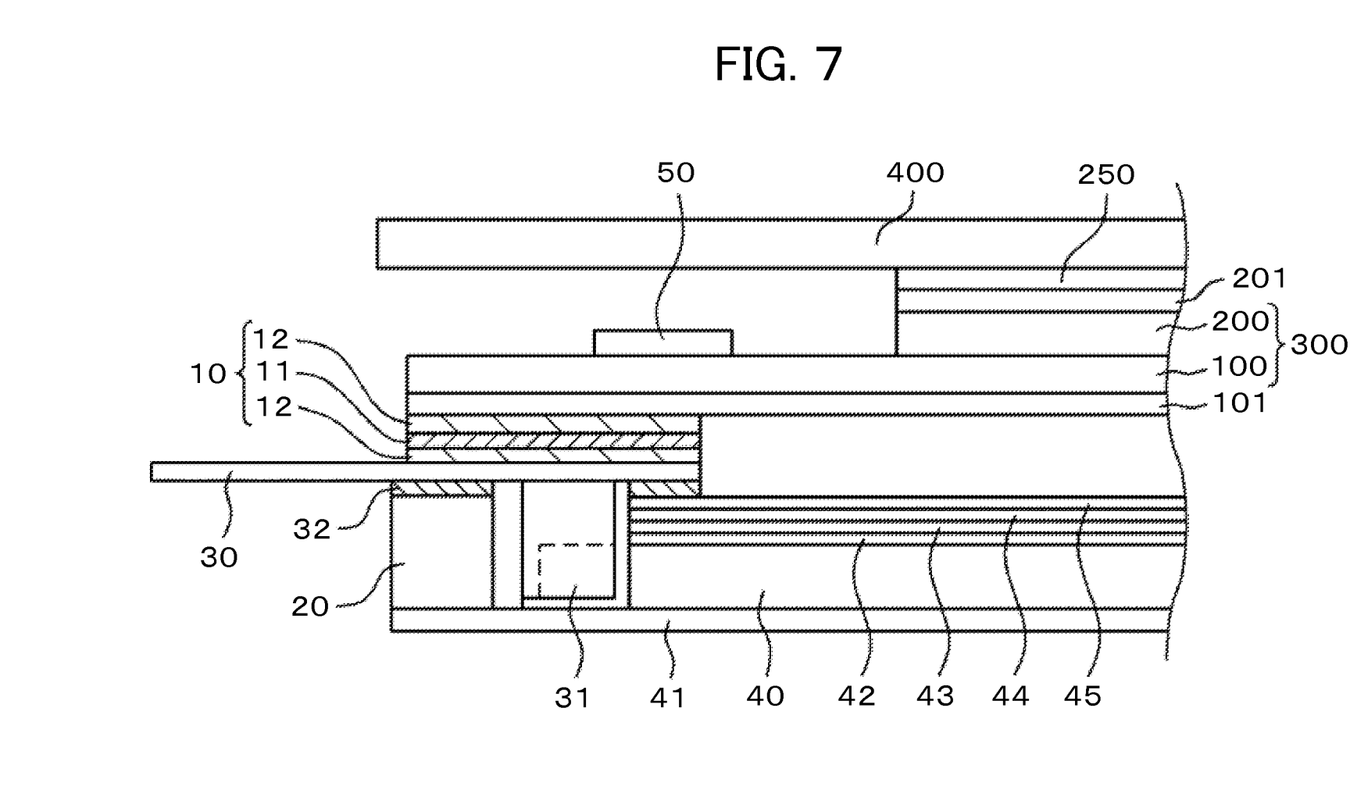
FIG. 7 is a cross-sectional view taken along the line of C-C of FIG. 1.

FIG. 2 is a cross-sectional view taken along the line A-A of FIG. 1, FIG. 3 is a cross-sectional view taken along the line B-B of FIG. 1, and FIG. 7 is a cross-sectional view taken along the line C-C of FIG. 1. At first, FIG. 3 will be described. In FIG. 3, a backlight is accommodated into the mold 20. A reflection sheet 41 is attached to the lower surface of the mold 20. A light guide plate 40 is mounted on the reflection sheet 41. An LED that is a light source is arranged on the other lateral side of the light guide plate 40, as illustrated in FIG. 7.

A lower diffusion sheet 42, a lower prism sheet 43, an upper prism sheet 44, and an upper diffusion sheet 45 are mounted on the light guide plate 40. The light guide plate 40 works to irradiate a light emitted from the LED arranged in the lateral surface, from the main surface and to direct the light toward the liquid crystal display panel 300. The reflection sheet 41 arranged under the light guide plate 40 works to reflect a light directing downward from the light guide plate 40, into a direction toward the liquid crystal display panel 300.

There exists uneven luminescence in the light coming from the light source to the light guide plate 40 and emitting from the main surface of the light guide plate 40. The lower diffusion sheet 42 serves to reduce the uneven luminescence. Further, the lights emitting from the light guide plate 40 are various in angle with respect to the normal direction of the light guide plate 40, which is defective in the utilization efficiency of the lights. The prism sheet is to collimate the lights from the light guide plate in a direction of the liquid crystal display panel, to improve the utilization efficiency of the lights.

The lower prism sheet 43 is to converge, for example, the lights directing to the x axis direction, in the z axis direction, in other words, in the direction toward the liquid crystal display panel 300. Further, the upper prism sheet 44 is to converge, for example, the lights directing to the y axis, in the z axis direction.

The upper diffusion sheet 45 is arranged on the upper prism sheet 44. The prism sheet is formed in a shape of projection to have a triangle cross section with its ridge line extending in the x axis direction or in the y axis direction. Therefore, when microscopically seeing a light emitted from the prism sheet, the light includes a bright portion and a dark portion in a line shape. According to this, there occurs interference between a linear light shielding region formed by a scanning line or a video signal line formed on the liquid crystal display panel 300 and the emitted light from the prism sheet, which results in occurrence of moire. The upper diffusion sheet 45 works to prevent this moire.

This optical sheet group does not always include four sheets but it may include three, or five if including a polarization reflection sheet. The type and the number of the optical sheets to be used is determined by the purpose and the usage of the display device.

In FIG. 3, the liquid crystal display panel 300 is mounted on the upper surface of the mold 20. The liquid crystal display panel 300 in this specification means a panel including a TFT substrate 100 where scanning lines, video signal lines, pixel electrodes, and TFTs are arranged and an opposite substrate 200 with a liquid crystal layer interposed therebetween, a lower polarizing plate 101 attached to the lower surface of the TFT substrate 100, and an upper polarizing plate 201 attached to the upper surface of the opposite substrate 200. The liquid crystal display panel 300 is attached to the mold with the light shielding tape 10. Actually, the lower polarizing plate 101 of the liquid crystal display panel 300 is attached to the mold through the light shielding tape 10.

The touch panel 400 is attached to the upper surface of the liquid crystal display panel 300 with a bonding agent 250. As the bonding agent 250, an ultraviolet curing resin is often used. The bonding agent 250 is originally liquid, but when it is used in the atmosphere, air bubbles enter into the bonding agent 250 in many cases. In order to prevent this, the bonding agent is often cured in the decompressed atmosphere.

FIG. 7 is a cross-sectional view taken along the line C-C of FIG. 1, showing a terminal unit of the liquid crystal display panel 300. As illustrated in FIG. 7, in the terminal unit of the liquid crystal display panel 300, there is no other layer than one TFT substrate, where the IC driver 50 is mounted and the flexible wiring substrate to supply power and signals to the liquid crystal display panel 300 is connected; FIG. 7, however, omits the flexible wiring substrate.

The upper polarizing plate 201 is attached to the upper surface of the opposite substrate 200 and the touch panel 400 is attached to the upper surface of the upper polarizing plate 201 with the bonding agent 250 made of ultraviolet curing resin. In FIG. 7, the lower polarizing plate 101 is attached to the lower surface of the TFT substrate 100 and the lower polarizing plate 101 is attached to the flexible wiring substrate 30 for backlight with the light shielding tape 10. This point is different from FIG. 2 or FIG. 3.

The flexible wiring substrate 30 for backlight is to supply signals and power to the LED 31 that is a light source. In FIG. 7, the reflection sheet 41 is attached to the lower surface of the mold 20, similarly to FIG. 2. Further, the light guide plate 40 and the optical sheet group are mounted on the reflection sheet 41, similarly to FIG. 2.

In FIG. 7, the flexible wiring substrate 30 is attached to the upper surface of the mold 20 through an adhesive 32 for the flexible wiring substrate. The flexible wiring substrate 30 is attached to the upmost sheet of the optical sheet through the adhesive 32. The LED 31 is suspended from the flexible wiring substrate 30 along the lateral surface of the light guide plate 40. The flexible wiring substrate 30 is to supply power to the LED 31 and supply a signal for controlling the LED 31.

Figure 8:
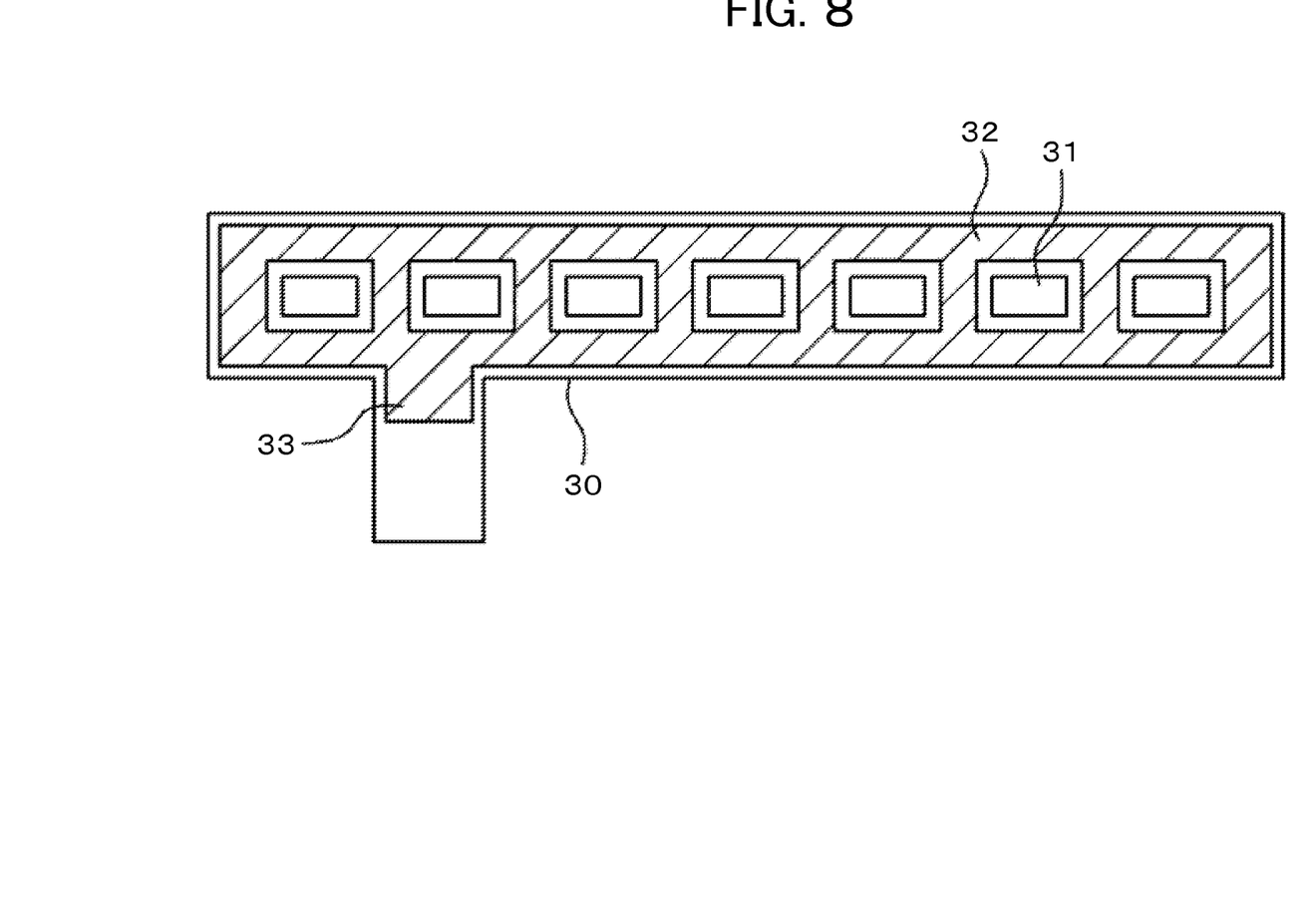
FIG. 8 is a top plan view of a flexible wiring substrate for LED.

FIG. 8 is a top plan view of the flexible wiring substrate 30 illustrated in FIG. 7, viewed from the lower side. In FIG. 8, the flexible wiring substrate 30 extends in a horizontal direction and seven LEDs 31 are arranged at a predetermined pitch in the horizontal direction. In a portion where the LED 31 does not exist, the mold 20 or the adhesive 32 for adhering to the optical sheet are formed. The adhesive 32 includes a protruding portion 33 in order to increase the adhesion area with the mold 20 as much as possible.

According to this, in the terminal unit, even in the portion where the flexible wiring substrate 30 for LED exists, the mold 20 is designed to be hermetically sealed. In FIG. 7, the lower polarizing plate 101 exists even in the terminal unit of the TFT substrate 100; however, depending on the type, the lower polarizing plate 101 is formed only in the display region. In this case, the light shielding tape 10 directly adheres to the TFT substrate 100. However, the function is the same as described in the above and in FIG. 7, the inside of the mold is hermetically sealed similarly.

As illustrated in FIGS. 3 and 7, heretofore, the inside of the mold 20 is hermetically sealed by the reflection sheet 41 in the lower side and by the liquid crystal display panel 300 in the upper side. Especially, in these days, the fringe portion of the liquid crystal display panel 300 gets narrower; as the result, the width of attaching the liquid crystal display panel 300 to the mold 20 or the reference symbol w indicated in FIG. 3 gets smaller. Accordingly, in order to avoid the liquid crystal display panel 300 peeling off from the mold 20, there is an increasing demand for hermetically sealing the inside of the mold 20.

However, when the liquid crystal display device is put in the decompressed atmosphere, the air inside the mold 20 expands, to generate a force of peeling off the crystal display panel 300. As the result, in the process of attaching the touch panel 400 to the liquid crystal display panel 300, there occurs a failure of the liquid crystal display panel 300 peeling off from the mold 20 in the decompressed atmosphere.

FIG. 2 is a cross-sectional view illustrating the features of the invention. FIG. 2 is a cross-sectional view taken along the line A-A of FIG. 1 and a cross-sectional view of a portion including the vent hole 15 of the light shielding tape 10. FIG. 2 is the same as FIG. 3, except for the portion of the light shielding tape 10 which attaches the liquid crystal display panel 300 to the mold 20. In the cross section illustrated in FIG. 2, the light shielding tape 10 which is to attach together the mold 20 and the liquid crystal display panel 300 includes a space 13, with no adhesive on one surface. Therefore, in the cross section of FIG. 2, the light shielding tape 10 is not provided with a function of attaching together the mold 20 and the liquid crystal display panel 300. In other portion, however, the liquid crystal display panel 300 is attached to the mold 20 by the light shielding tape 10, as illustrated in FIGS. 1 and 3. The area of the vent hole 15 in the light shielding tape 10 is extremely small compared to the area of the other portion, which does not impair the adhesive force of the liquid crystal display panel 300 and the mold 20.

As mentioned above, in the vent hole 15, the lower side of the light shielding tape 10 is the space 13; therefore, even when the assembled body of the liquid crystal display panel 300 and the mold 20 is put in the decompressed atmosphere, the air inside the mold 20 is exhausted from the space 13 and there occurs no stress for peeling off the liquid crystal display panel 300 from the mold 20. Therefore, when attaching together the liquid crystal display panel 300 and the touch panel 400 in the decompressed atmosphere, it is possible to avoid a phenomenon of peeling off the liquid crystal display panel 300 from the mold 20.

Figure 4:
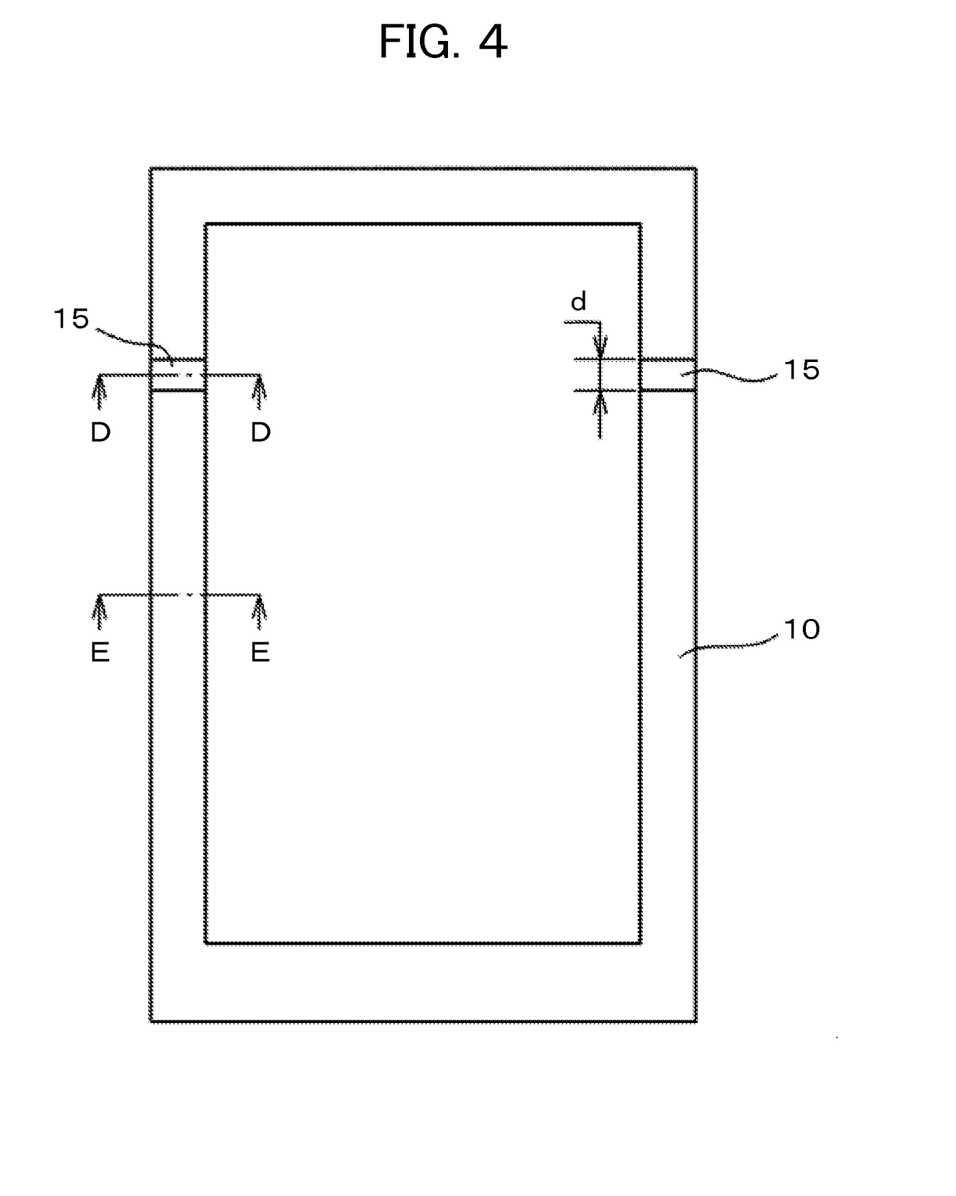
FIG. 4 is a top plan view of a light shielding tape.

FIG. 4 is a top plan view of the light shielding tape 10. In FIG. 4, the vent holes 15 are formed at two positions of the long sides of the light shielding tape 10. In FIG. 4, the length d of the vent hole 15 in a circumferential direction of the light shielding tape 10 is 0.5 mm to 2 mm, typically about 1 mm. Thus, the vacant length d of the vent hole 15 is so small that the adhesive force of the liquid crystal display panel 300 and the mold 20 is hardly affected.

Figure 5:
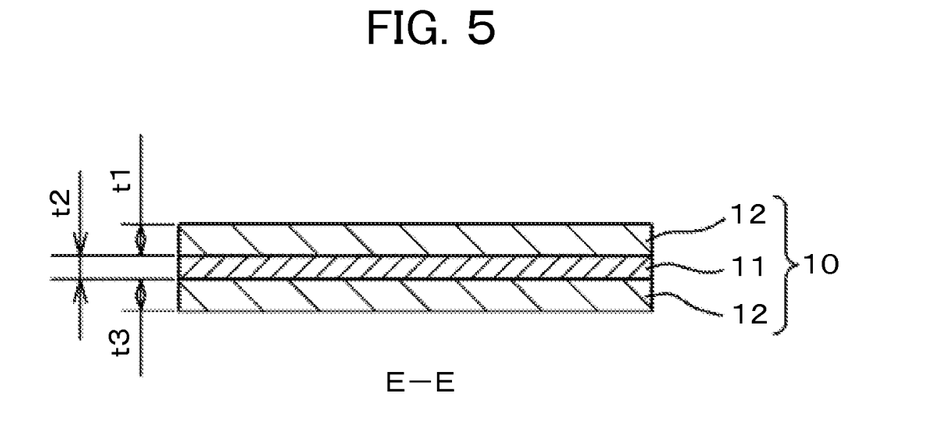
FIG. 5 is a cross-sectional view taken along the line of E-E of FIG. 4.

FIG. 5 is a cross-sectional view taken along the line E-E of FIG. 4, showing the cross sectional structure of the light shielding tape 10. In FIG. 5, the light shielding tape 10 is formed by the adhesives 12 on the both sides of a base 11 made of black polyethylene terephthalate (PET). The thickness of the PET that is the base 11 is 10 μm, each thickness of the both adhesives 12 is 20 μm, and the thickness of the light shielding tape 10 is 50 μm in total.

Figure 6:
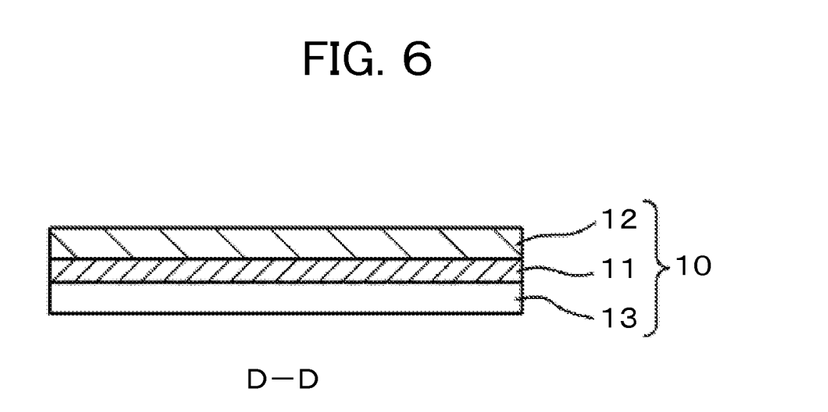
FIG. 6 is a cross-sectional view taken along the line of D-D of FIG. 4.

FIG. 6 is a cross section taken along the line D-D of FIG. 4. In FIG. 6, the adhesive 12 is formed on the upper surface of the base 11 of the PET but not formed on the lower surface. When this light shielding tape 10 is attached to the mold 20, the portion without the adhesive 12 becomes the space 13 and this portion becomes the vent hole 15. In FIG. 6, the portion without the adhesive 12 is formed on the lower portion of the base 11 of the PET; however, it may be formed on the upper portion of the PET. The effect is the same.

Further, the portion without the adhesive 12 may be formed on the both sides of the base 11 of the PET. In this case, the balance can be kept between the adhesive force of the liquid crystal display panel 300 and the light shielding tape 10 and the adhesive force of the mold 20 and the light shielding tape 10. Further, the length d of the portion without the adhesive 12 in a circumferential direction can be decreased more than in the case of the portion without the adhesive 12 formed only on one side.

As mentioned above, according to the invention, it is possible to avoid the liquid crystal display panel 300 from peeling off from the mold 20 in the decompressed atmosphere when attaching the touch panel 400 to the liquid crystal display panel 300, thereby increasing the manufacturing yield. Further, it is possible to eliminate a stress for peeing off the liquid crystal display panel 300 from the mold 20 caused by the expansion of the inside air, thereby improving the reliability of the liquid crystal display device. In the embodiment, the vent hole 15 is formed by partially eliminating the adhesive 12 on one side or both sides of the base 11 made of the black PET of the light shielding tape 10; therefore, light shielding effect by the light shielding tape 10 can be kept even in the portion where the vent hole 15 exists.

Second Embodiment

Figure 9:
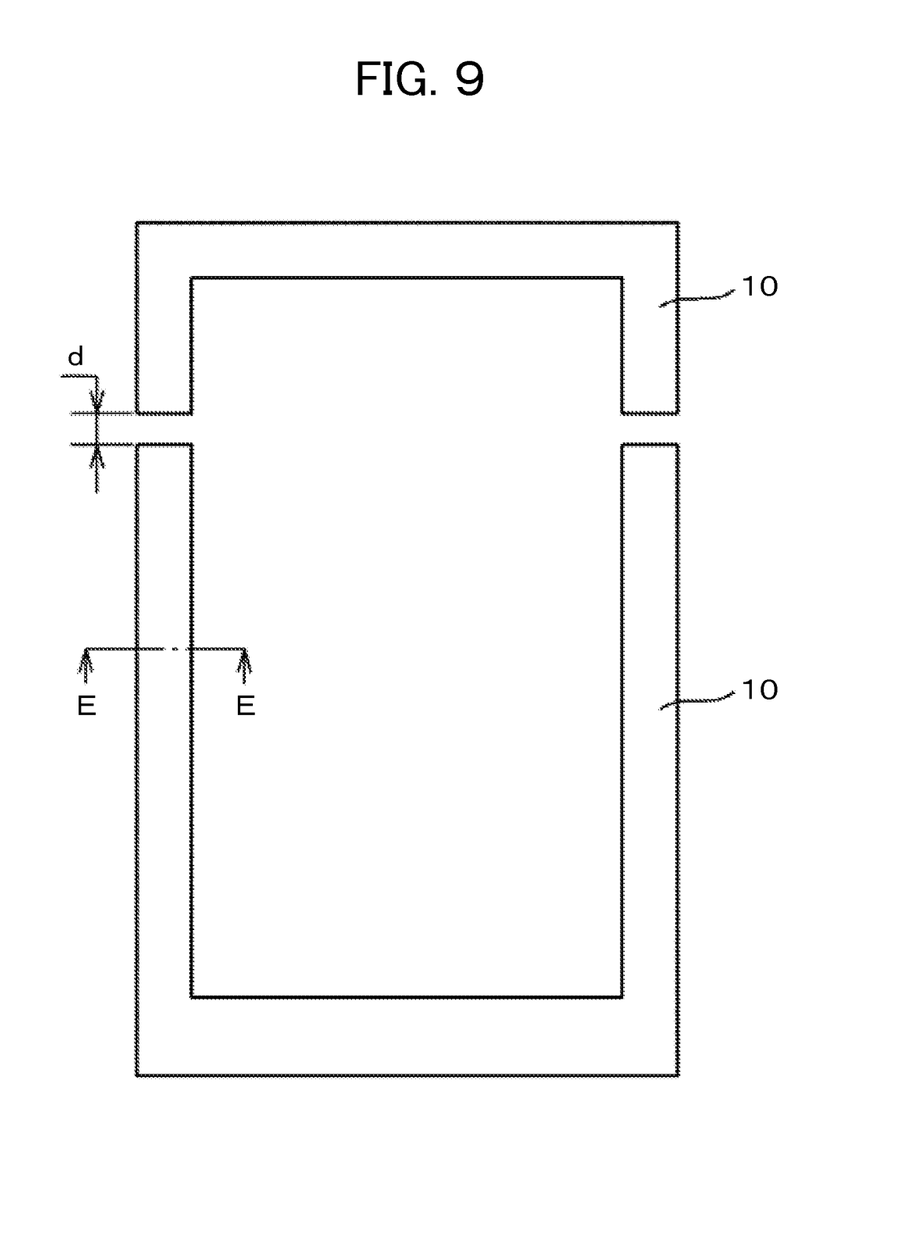
FIG. 9 is a top plan view of a light shielding tape according to a second embodiment.
Figure 10:
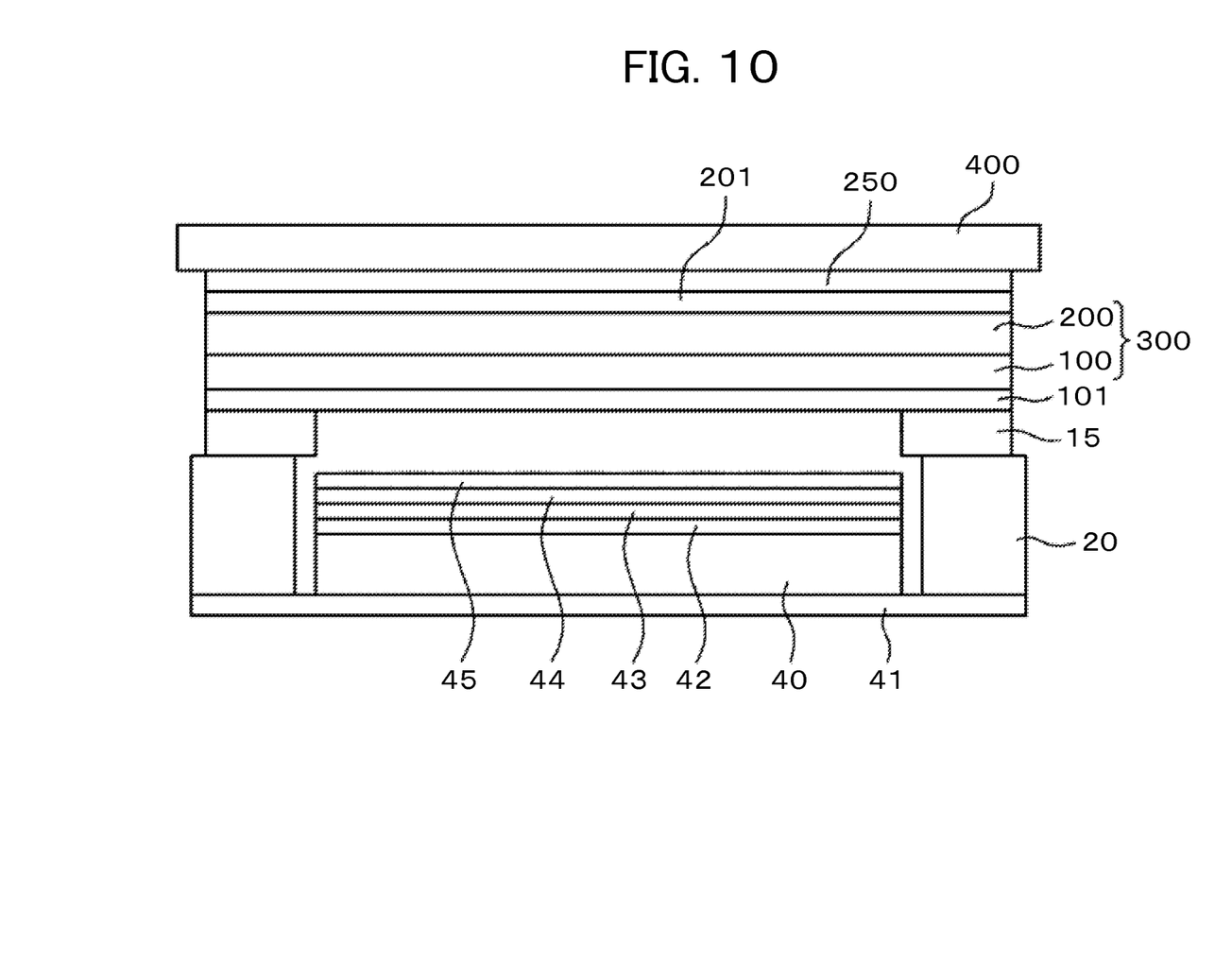
FIG. 10 is a cross-sectional view of the second embodiment.

FIG. 9 is a top plan view of a light shielding tape 10 according to a second embodiment. The light shielding tape 10 illustrated in FIG. 9 consists of two parts and in the portions corresponding to the vent holes 15 of FIG. 1, there is no light shielding tape 10. FIG. 10 is a cross-sectional view of a liquid crystal display device according to the embodiment corresponding to the cross section taken along the line A-A of FIG. 1. In FIG. 10, the portion of the vent hole 15 is a whole hole 15, with no existence of the light shielding tape. In FIG. 9, the length d in which the light shielding tape 10 does not exist is 0.5 mm to 2 mm, typically 1 mm, similarly to the first embodiment.

Because of the existence of the vent hole 15, this embodiment is also free from a problem of the liquid crystal display panel 300 peeling off from the mold 20 caused by the expansion of the inside air when the liquid crystal display device is put in the decompressed atmosphere in order to attach the touch panel 400 to the liquid crystal display panel 300.

The embodiment, however, has a problem that a light from the backlight is leaked from the portion of the vent hole 15 because there exists none of the base 11 of black PET having a light shielding function of the light shielding tape 10. On the other hand, because the light shielding tape 10 in the embodiment consists of two parts, material yield in forming the light shielding tape 10 can be increased.

Specifically, the light shielding tape 10 in a U-shape plan are alternately arranged, instead of one frame shape; therefore, much more light shielding tapes 10 can be obtained from a predetermined material. For example, FIG. 9 illustrates the upper light shielding tape 10 smaller than the lower light shielding tape 10; however, the size of the upper light shielding tape 10 can be formed identical to that of the lower light shielding tape 10, hence to further improve the material yield. When using this light shielding tape 10, the vent holes 15 illustrated in FIG. 1 are disposed at the center portions of the both long sides of the light shielding tape.

Third Embodiment

Figure 11:
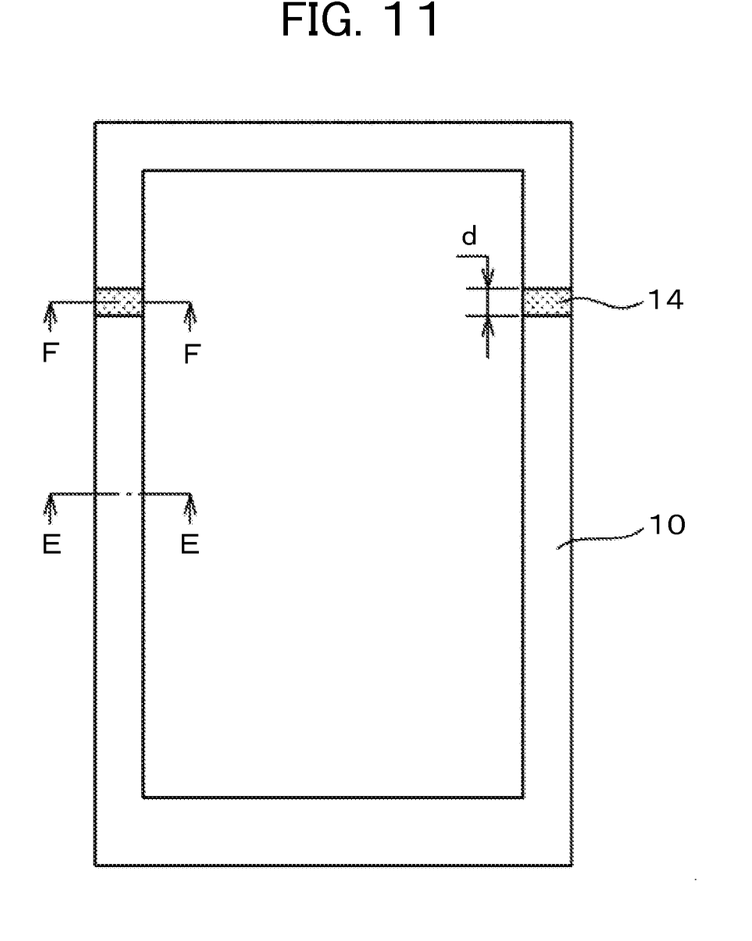
FIG. 11 is a top plan view of a light shielding tape according to a third embodiment.

FIG. 11 is a top plan view of a light shielding tape 10 used in this embodiment. The portion corresponding to the vent hole 15 of FIG. 1 is formed in a four layer structure in FIG. 11 and a cover layer 14 is formed in FIG. 11. The cross section taken along the line E-E of FIG. 11, except for the portion of the cover layer 14, is formed in a three layer structure as illustrated in FIG. 5.

Figure 12:
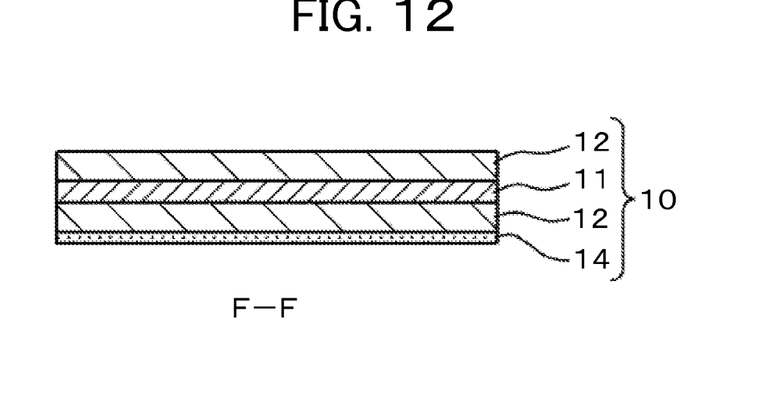
FIG. 12 is a cross-sectional view taken along the line F-F of FIG. 11.

The cross-sectional view taken along the line F-F of FIG. 11 is illustrated in FIG. 12. In FIG. 12, a material 14 having no adhesive is printed or coated by an inkjet on the surface of one adhesive layer 12, in addition to the cross section illustrated in FIG. 5. According to this, only the portion 14 illustrated in FIG. 11 can be a portion of the light shielding tape 10 unable to adhere to something.

Figure 13:
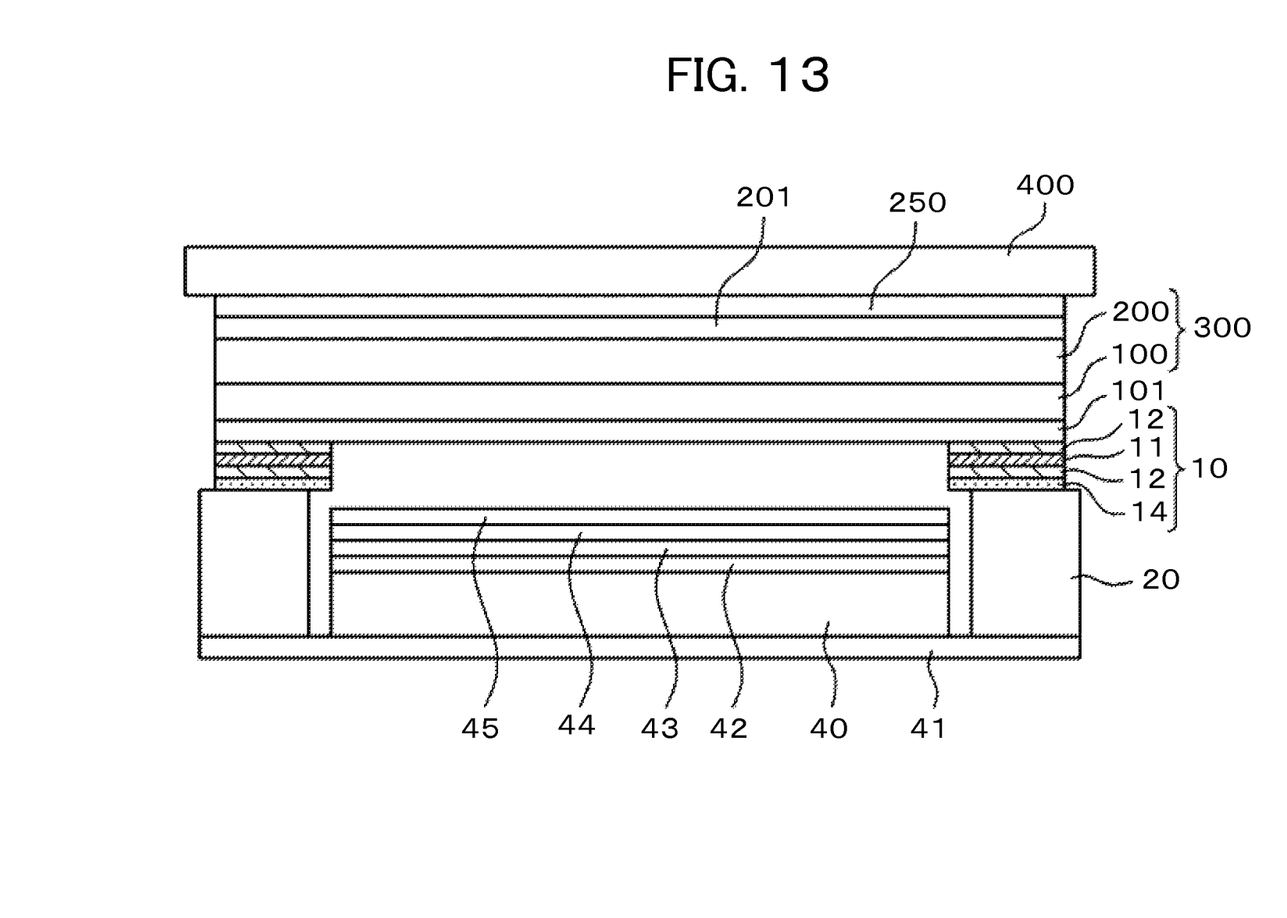
FIG. 13 is a cross-sectional view of the third embodiment.

FIG. 13 is a cross-sectional view in the embodiment corresponding to the cross section taken along the line A-A of FIG. 1. In FIG. 13, although the light shielding tape 10 exists between the mold 20 and the lower polarizing plate 101 of the liquid crystal display panel 300, the non adhesive material 14 is coated on the portion of the light shielding tape 10 which is in contact with the mold 20 and the light shielding tape 10 does not adhere to the mold 20 in this portion.

In short, this portion spoils the sealing property of the mold 20. Therefore, in the process of attaching together the liquid crystal display panel 300 and the touch panel 400 with a bonding agent, even when the assembled body of the liquid crystal display device and the mold 20 is put in the decompressed atmosphere, the air inside the mold is exhausted from the portion where the light shielding tape 10 does not adhere to the mold 20; as the result, it is possible to avoid the generation of a force for peeling off the liquid crystal display panel 300 from the mold 20 caused by the expansion of the air inside the mold 20.

In FIG. 11, the distance d of the light shielding tape 10 in a circumferential direction, where the cover layer 14 having no adhesive is provided, is 0.5 mm to 2 mm, typically about 1 mm, similarly to the first embodiment. In FIGS. 11 to 13, the cover layer 14 having no adhesive is provided only on the adhesive layer 12 at one side of the base 11 but may be provided on the adhesive layers 12 at the both sides of the base 11.

In the above embodiment, the case of attaching the touch panel 400 to the liquid crystal display panel 300 with the bonding agent 250 has been described. The contents of the invention can be applied also to the case of attaching a front window to the liquid crystal display panel 300 as a protective plate. Further, the invention can be applied also to the case of attaching the touch panel 400 to the liquid crystal display panel 300 before further attaching a front window to the touch panel 400 as a protective plate.

The above embodiments have been described in the case of attaching the touch panel 400 to the liquid crystal display panel 300 with the bonding agent 250 in the decompressed atmosphere. The contents of the invention, however, can be applied also to the case of attaching the touch panel 400 to the liquid crystal display panel 300 with an adhesive in the decompressed atmosphere. It can be applied also to the case of attaching a front window to the liquid crystal display panel or the touch panel with an adhesive in the decompressed atmosphere.

What is claimed is:

1. A liquid crystal display device in which a liquid crystal display panel is attached to a mold accommodating a backlight by a light shielding tape and a touch panel is attached to the liquid crystal display panel,
    wherein the light shielding tape includes adhesives on both sides of a black base,
    the light shielding tape has a portion without the adhesive on one side of the tape for a predetermined length of the light shielding tape in a circumferential direction, and
    the portion without the adhesive extends across a full width of the light shielding tape in a direction perpendicular to the circumferential direction for a vent hole.

2. The display according to claim 1, wherein the touch panel is attached to the liquid crystal display panel by an ultraviolet curing resin.

3. The display according to claim 1, wherein the predetermined length of the light shielding tape in a circumferential direction where the adhesive does not exist is 2 mm and less.

4. The display according to claim 1, wherein the light shielding tape has a portion without the adhesive on the other side of the tape for a predetermined length of the light shielding tape in a circumferential direction.

5. The display according to claim 1, wherein a front window is further formed on the touch panel.

6. A liquid crystal display device in which a liquid crystal display panel is attached to a mold accommodating a backlight by a light shielding tape and a touch panel is attached to the liquid crystal display panel,
wherein the light shielding tape includes adhesives on both sides of a black base,
a non-adhesive material is coated on the adhesive on one side of the light shielding tape for a predetermined length of the tape in a circumferential direction, and
the non-adhesive material is coated across a total width of the light shielding tape in a direction perpendicular to the circumferential direction for vent portion.

7. The display according to claim 6, wherein the touch panel is attached to the liquid crystal display panel by an ultraviolet curing resin.

8. The display according to claim 6, wherein the predetermined length of the light shielding tape in a circumferential direction where the non-adhesive material is coated is 2 mm and less.

9. The display according to claim 6, wherein the light shielding tape has a portion without the adhesive on the other side of the tape for a predetermined length of the light shielding tape in a circumferential direction.

10. The display according to claim 6, wherein a front window is further formed on the touch panel.

11. A liquid crystal display device comprising:
a liquid crystal display panel;
a backlight;
a mold accommodating the backlight;
a touch panel attached to the liquid crystal display panel; and
a light shielding tape for attaching the liquid crystal display panel to the mold,
wherein the light shielding tape includes a black material and an adhesive stacked on the base,
the light shielding tape includes a first portion without the adhesive for a predetermined length and a second portion with the adhesive,
a periphery of the liquid crystal display panel is surrounded by the second portion, except for the first portion, and
the first portion without the adhesive extends across a full width of the light shielding tape in a direction perpendicular to the circumferential direction for a vent hole.

12. The display according to claim 11, wherein the touch panel is attached to the liquid crystal display panel by an ultraviolet curing resin.

13. The display according to claim 11, wherein the predetermined length of the light shielding tape in a circumferential direction corresponding to the first portion is 2 mm and less.

14. The display according to claim 11, wherein the adhesive is formed on the other side of the base in the first portion.

15. The display according to claim 11, wherein a front window is further formed on the touch panel.

* * * * *